(12) United States Patent
Lee

(10) Patent No.: US 10,461,510 B2
(45) Date of Patent: Oct. 29, 2019

(54) MODULAR DISTRIBUTING PANEL INCLUDING A TRANSFORMER

(71) Applicant: LSIS CO., LTD., Anyang-si, Gyeonggi-do (KR)

(72) Inventor: Jaegul Lee, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/283,132

(22) Filed: Sep. 30, 2016

(65) Prior Publication Data

US 2017/0207607 A1 Jul. 20, 2017

(30) Foreign Application Priority Data

Jan. 20, 2016 (KR) .................. 20-2016-0000322 U

(51) Int. Cl.
| | |
|---|---|
| *H02B 1/30* | (2006.01) |
| *H02B 1/06* | (2006.01) |
| *H02B 1/01* | (2006.01) |
| *H02B 1/52* | (2006.01) |
| *H02B 1/56* | (2006.01) |

(52) U.S. Cl.
CPC ............ *H02B 1/308* (2013.01); *H02B 1/06* (2013.01); *H02B 1/012* (2013.01); *H02B 1/301* (2013.01); *H02B 1/52* (2013.01); *H02B 1/565* (2013.01)

(58) Field of Classification Search
CPC . H02B 1/308; H02B 1/52; H02B 1/56; H02B 1/565; H02B 1/06
USPC ................................................ 361/600–678
See application file for complete search history.

(56) References Cited

U.S. PATENT DOCUMENTS

| | | | | | |
|---|---|---|---|---|---|
| 2,237,812 A | * | 4/1941 | De Blieux | ............... | H02B 1/52 |
| | | | | | 361/603 |
| 6,215,653 B1 | * | 4/2001 | Cochran | .................. | H02B 5/00 |
| | | | | | 361/602 |
| 6,225,554 B1 | * | 5/2001 | Trehan | ................. | H05K 9/0015 |
| | | | | | 174/365 |

(Continued)

FOREIGN PATENT DOCUMENTS

| | | |
|---|---|---|
| CA | 1057842 | 7/1979 |
| CN | 2674728 Y | 1/2005 |
| CN | 201748043 U | 2/2011 |
| CN | 202474631 U | 10/2012 |

(Continued)

OTHER PUBLICATIONS

European Patent Office Application Serial No. 16189467.0, Search Report dated May 15, 2017, 6 pages.

(Continued)

*Primary Examiner* — Zachary Pape
(74) *Attorney, Agent, or Firm* — K&L Gates LLP

(57) ABSTRACT

The present disclosure may include a base frame; a transformer panel module having a main frame and a transformer disposed at an upper side of the base frame; a high voltage panel module having a high voltage enclosure coupled to one side of the main frame and a high voltage switch mounted within the high voltage enclosure; and a low voltage panel module having a low voltage enclosure coupled to the other side of the main frame and at least one of a breaker and a fuse mounted within the low voltage enclosure, thereby having an advantage of facilitating a service work for maintenance on the transformer panel module, high voltage panel module and low voltage panel module as well as minimizing a service time.

6 Claims, 6 Drawing Sheets

(56) References Cited

U.S. PATENT DOCUMENTS

| | | | | |
|---|---|---|---|---|
| 6,945,616 | B2* | 9/2005 | Webster | H02B 1/50 312/223.1 |
| 6,971,320 | B1* | 12/2005 | Maldonado-Cortes | F16M 5/00 108/51.11 |
| 6,999,305 | B1* | 2/2006 | Calcote | H02B 1/01 174/50 |
| 7,312,993 | B2* | 12/2007 | Bundza | H05K 7/206 165/104.33 |
| 8,427,814 | B1 | 4/2013 | Gonce | |
| 8,456,814 | B2* | 6/2013 | Gerovac | H02B 1/38 174/50 |
| 2009/0213531 | A1* | 8/2009 | Berggren | H02B 7/06 361/603 |
| 2009/0267466 | A1* | 10/2009 | Zook | E05C 9/043 312/223.6 |

FOREIGN PATENT DOCUMENTS

| | | |
|---|---|---|
| CN | 103579932 A | 2/2014 |
| CN | 103683016 A | 3/2014 |
| CN | 204068001 U | 12/2014 |
| DE | 3115653 | 11/1982 |
| DE | 19650931 | 6/1998 |
| KR | 1020000012177 | 3/2000 |
| KR | 200256103 | 12/2001 |
| KR | 200356674 | 7/2004 |
| KR | 100562931 | 3/2006 |
| KR | 100920405 | 10/2009 |
| KR | 1020120045728 | 5/2012 |

OTHER PUBLICATIONS

Chinese Office Action for related Chinese Application No. 201710049199.0; action dated Feb. 22, 2019; (7 pages).

* cited by examiner

MODULAR DISTRIBUTING PANEL INCLUDING A TRANSFORMER

CROSS-REFERENCE TO RELATED APPLICATIONS

Pursuant to 35 U.S.C. § 119(a), this application claims the benefit of earlier filing date and right of priority to Korean Patent Application No. 20-2016-0000322, filed on Jan. 20, 2016, the contents of which are all hereby incorporated by reference herein in its entirety.

BACKGROUND OF THE INVENTION

1. Field of the Invention

The present invention relates to a distributing panel, and more particularly, to a distributing panel having a switch and a transformer.

2. Description of the Related Art

Distributing panel is a device for receiving power to supply power to a load device installed at each power consumer.

The distributing panel may monitor, control and protect a power system, and various electrical devices such as a switch, a transformer and the like may be accommodated and used in the distributing panel.

The distributing panel may be preferably configured to secure the reliability and safety of a power distribution system as well as facilitate maintenance.

The distributing panel can be configured with an integrated distributing panel in which individual devices (for example, a switch, a transformer, and the like) applied to a power distribution system are mounted within one case (i.e., integrated enclosure) to minimize a space. Such an integrated distributing panel may be installed outdoors, and in this case it may be configured with an outdoor integrated distributing panel.

When the distributing panel is configured with an integrated distributing panel, a switch, a transformer and a distributor may be installed within one case, and partition walls for implementing a protection degree to a high voltage unit including a switch, a transforming unit including a transformer, and a low voltage unit including a distributor, respectively, may be installed within one case.

SUMMARY OF THE INVENTION

In a distributing panel according to the related art, a plurality of vertical partition walls may be installed within one case to divide it into three sections, and a high voltage unit, a low voltage unit and a transforming unit may be installed in the three sections, a case and vertical partition walls should be disassembled and reassembled when a maintenance work for any one of the high voltage unit, low voltage unit and transforming unit is carried out, thereby causing a problem in which the maintenance work is complicated and a long period of time is required to carry out a maintenance work.

The objective of the present disclosure is to provide a distributing panel capable of simplifying a maintenance work as well as minimizing a maintenance time.

A distributing panel according to an embodiment of the present disclosure may include a base frame; a transformer panel module having a main frame and a transformer disposed at an upper side of the base frame; a high voltage panel module having a high voltage enclosure coupled to one side of the main frame and a switch mounted within the high voltage enclosure; and a low voltage panel module having a low voltage enclosure coupled to the other side of the main frame and a distributor disposed within the low voltage enclosure.

The distributing panel may include a transformer panel module roof disposed at an upper side of the main frame.

The transformer panel module roof may include an upper lifting lug formed with a lifting hole.

The low voltage enclosure and high voltage enclosure may be disposed at an upper side of the base frame by interposing the transformer panel module therebetween.

The low voltage enclosure and high voltage enclosure may respectively include a fastening portion fastened to the base frame with a fastening member.

A lower hole for fork lift for inserting a lifter member of the fork lift may be formed on the base frame.

A left side and a right side of the transformer panel module may be respectively open. The high voltage enclosure may include a first side partition wall for blocking one of the left side and the right side of the transformer panel module. The low voltage enclosure may include a second side partition wall for blocking the other one of the left side and the right side of the transformer panel module.

The high voltage panel module may be disposed in such a manner that a high voltage cable penetration portion through which a high voltage cable passes is protruded in a lateral direction. The high voltage cable penetration portion may be disposed at an inner portion of the transformer panel module.

A transformer door may be disposed on at least one surface of a front surface and a rear surface of the transformer panel module. A side door may be disposed on a lateral surface of at least one of the high voltage panel module and low voltage panel module.

The transformer door may be disposed on the front surface and the rear surface of the transformer panel module, respectively. A ventilation hole may be disposed on the transformer door.

According to an embodiment of the present disclosure, the present disclosure may have an advantage of facilitating the fabrication of allowing at least one of the transformer panel module, high voltage panel module and low voltage panel module to have a protection degree different from those of the other modules.

Furthermore, the transformer panel module, high voltage panel module and low voltage panel module may be modularized and then assembled for each function, thereby having an advantage facilitating the assembly as well as reducing the fabrication time.

Furthermore, the present disclosure may have an advantage of allowing the maintenance or replacement for each module on the transformer panel module, high voltage panel module and low voltage panel module, respectively.

Furthermore, the transformer panel module, high voltage panel module and low voltage panel module may be independently configured, thereby having an advantage capable of minimizing propagation when an internal incident occurs.

Furthermore, the entire distributing panel may be easily lifted, thereby having an advantage of facilitating the transportation of the distributing panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a specific embodiment of the present disclosure will be described in detail with reference to the accompanying drawings.

Figure 1:
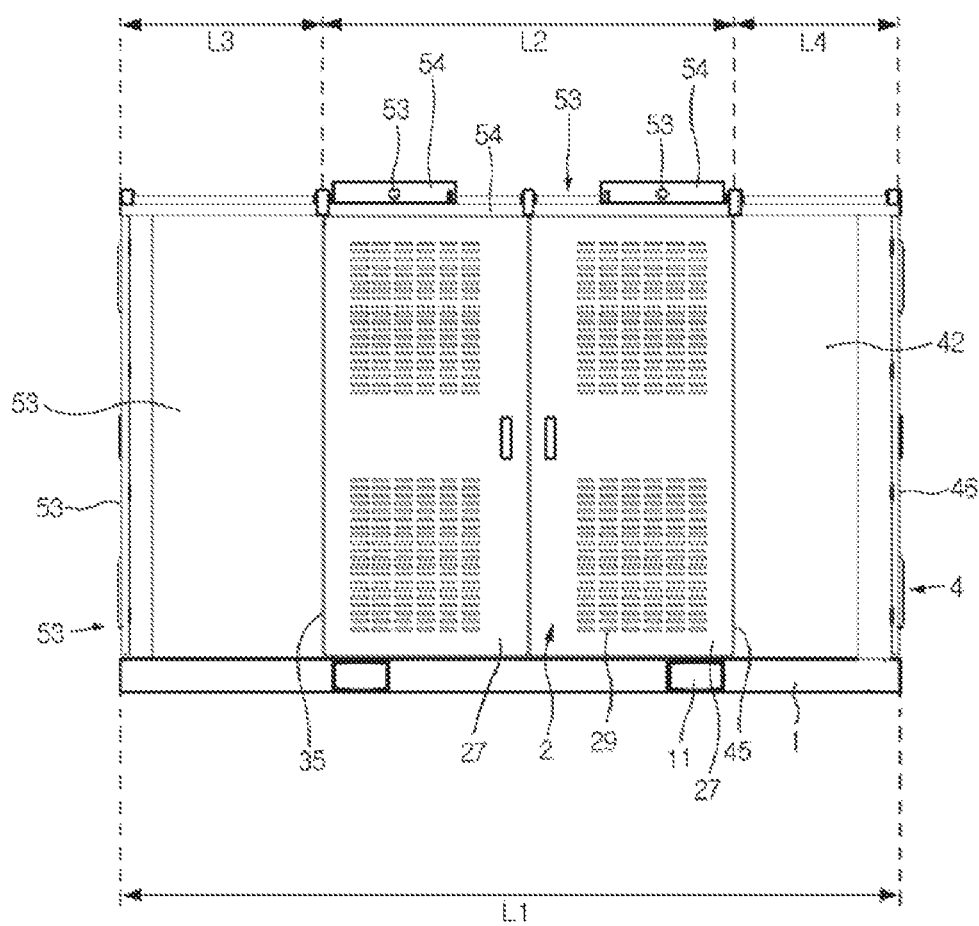
FIG. 1 is a front view illustrating a distributing panel according to an embodiment of the present disclosure.
Figure 2:
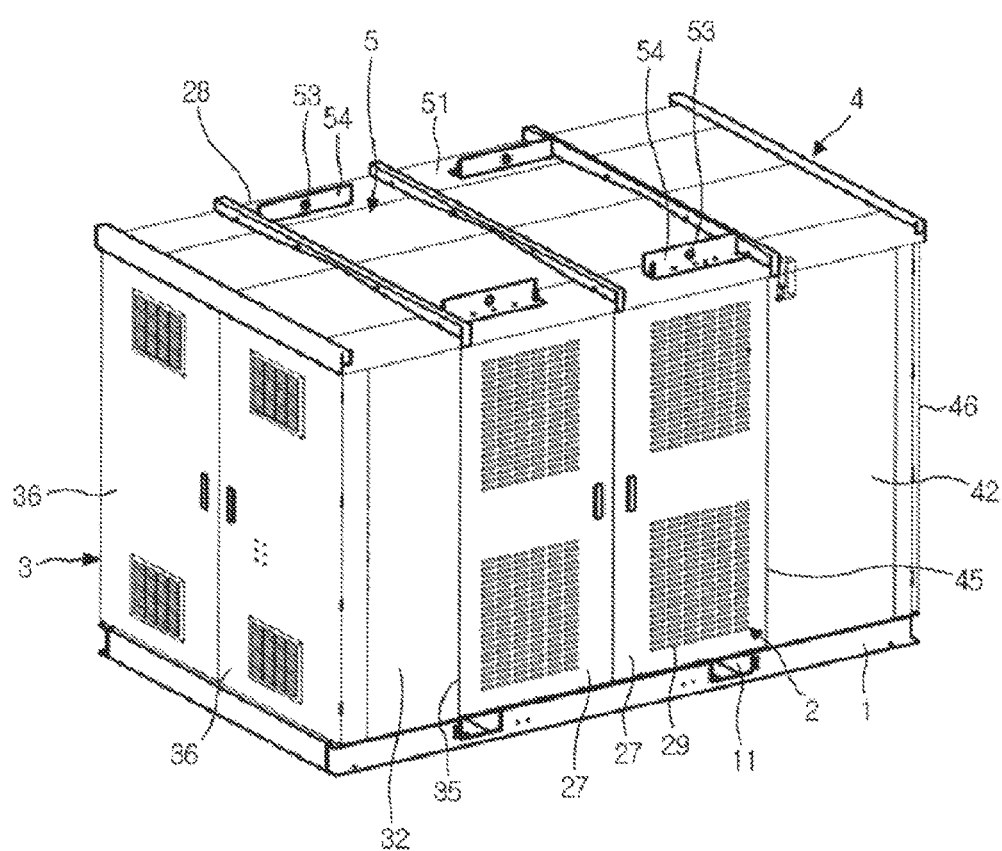
FIG. 2 is a perspective view illustrating a distributing panel according to an embodiment of the present disclosure.
Figure 3:
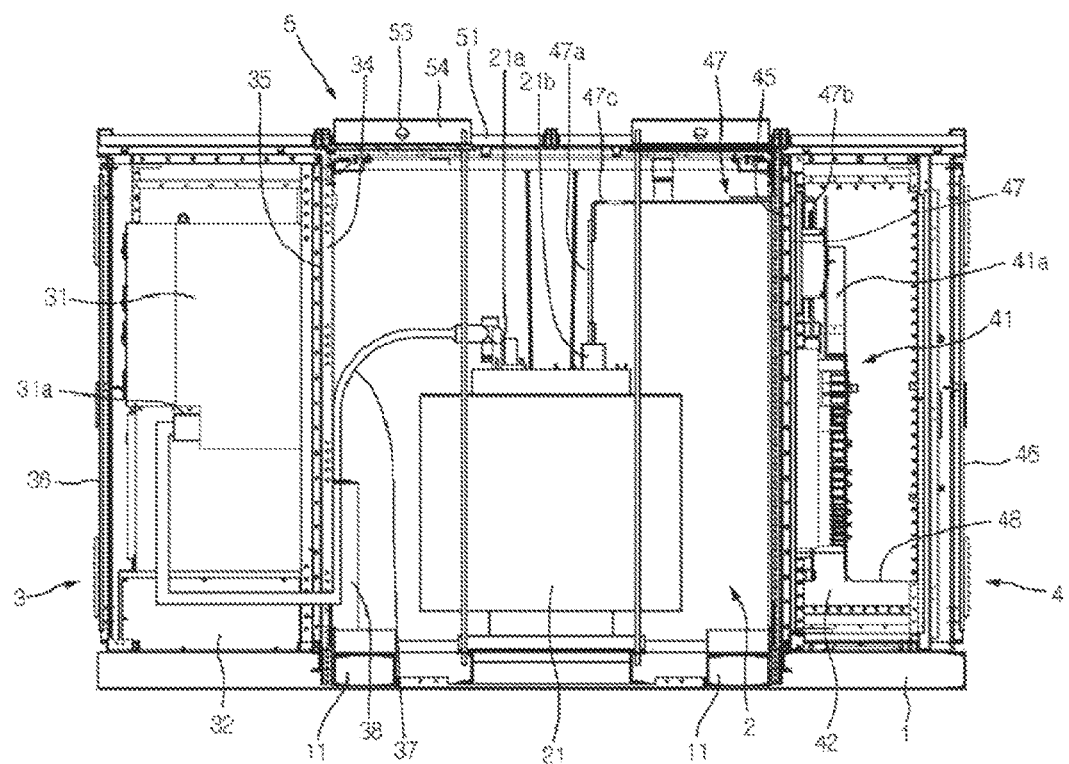
FIG. 3 is a front view illustrating an inside of a distributing panel according to an embodiment of the present disclosure.
Figure 4:
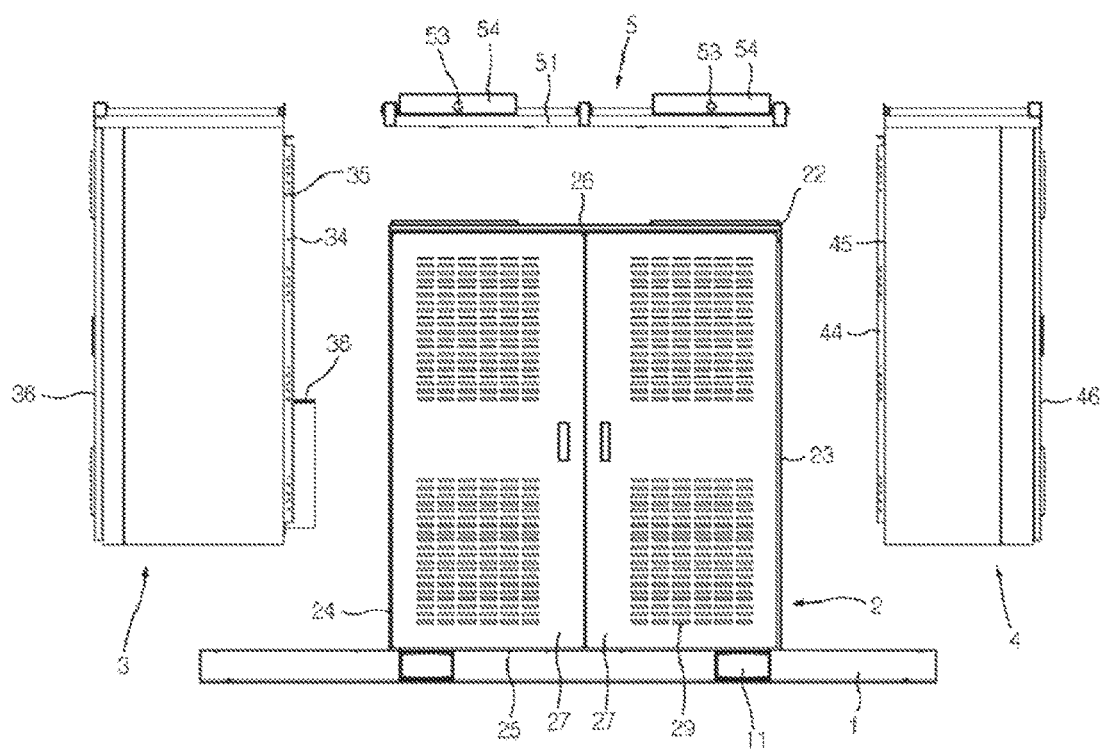
FIG. 4 is a front view in which a distributing panel according to an embodiment of the present disclosure is disassembled.

FIG. 1 is a front view illustrating a distributing panel according to an embodiment of the present disclosure, and FIG. 2 is a perspective view illustrating a distributing panel according to an embodiment of the present disclosure, and FIG. 3 is a front view illustrating an inside of a distributing panel according to an embodiment of the present disclosure, and FIG. 4 is a front view in which a distributing panel according to an embodiment of the present disclosure is disassembled.

The distributing panel may include a base frame 1, a transformer panel module 2, a high voltage panel module 3 and a low voltage panel module 4 as illustrated in FIGS. 1 through 4.

The distributing panel may be an integrated distributing panel in which the base frame 1, transformer panel module 2, high voltage panel module 3 and low voltage panel module 4 are integrally assembled, or an outdoor integrated distributing panel in which they are installed and used outdoors.

The distributing panel may include a switch 31, a transformer 21 and a distributor 41 as illustrated in FIG. 3. The distributing panel may receive high voltage power through the switch 31, and step down the high voltage power to low voltage through the transformer 21, and supply power to each power consumer through the distributor 41.

The distributing panel may dispose the switch 31, transformer 21 and distributor 41 over the high voltage panel module 3, transformer panel module 2 and low voltage panel module 4 in a distributed manner.

The high voltage panel module 3 may include the switch 31, and the transformer panel module 2 may include the transformer 21, and the low voltage panel module 4 may include the distributor 41.

For the distributing panel, the transformer panel module 2 may be installed on the base frame 1. The high voltage panel module 3 and low voltage panel module 4 may be fabricated separately from the transformer panel module 2, and assembled to be fastened to at least one of the transformer panel module 2 and base frame 1.

The high voltage panel module 3 provided with the switch 31, the transformer panel module 2 provided with the transformer 21, and the low voltage panel module 4 provided with the distributor 41 may be respectively and independently fabricated and then combined, and the high voltage panel module 3, transformer panel module 2 and low voltage panel module 4 may be fabricated to respectively have a protection degree and then integrally combined.

The high voltage panel module 3, transformer panel module 2 and low voltage panel module 4 may be fabricated such that a protection degree (IP rating, International Protection) of any one module of them is different from that of the other modules.

The high voltage panel module 3 provided with the switch 31 and the low voltage panel module 4 provided with the distributor 41 may respectively require higher stability than that of the transformer panel module 2 provided with the switch 31.

On the contrary, the transformer panel module 2 provided with the transformer 21 may require a relatively low protection degree in consideration of the cooling performance of the transformer 21 or the like.

The protection degree of the high voltage panel module 3 and the protection degree of the low voltage panel module 4 may be fabricated to have a higher protection degree than that of the transformer panel module 2. For example, the high voltage panel module 3 and low voltage panel module 4 may be fabricated to satisfy IP54 or above, and the transformer panel module 2 may be fabricated to satisfy IP31 lower than that of the high voltage panel module 3/low voltage panel module 4 in consideration of the cooling performance of the transformer 21 or the like.

The transformer panel module 2 may include the transformer 21. The transformer panel module 2 may include a main frame 22 disposed at an upper side of the base frame 1.

The high voltage panel module 3 may have a high voltage enclosure 32 coupled to one side of the main frame 22 and a switch 31 disposed within the high voltage enclosure 32.

The low voltage panel module 4 may have a low voltage enclosure 42 coupled to the other side of the main frame 22 and a distributor 41 disposed within the low voltage enclosure 42.

The distributing panel allows the switch 31, transformer 21 and distributor 41 to be installed together within one case. However, in this case, it is not easy to fabricate at least one of a portion surrounding the switch 31, a portion surrounding the transformer 21 and a portion surrounding the distributor 41 within one case with a different protection degree from that of the other portions, and when all the switch 31, transformer 21 and distributor 41 are installed within one case, a long period of time may be required for fabrication time. Furthermore, when an accident occurs within one case, the entire one case should be replaced or a long period of time will be required for maintenance.

As in the present disclosure, when the high voltage panel module 3, transformer panel module 2 and low voltage panel module 4 are individually configured and assembled with one another, it may be easy to fabricate them with a different protection degree for each module, thereby reducing entire fabrication time through segmentation for each module as well as facilitating maintenance or replacement.

Furthermore, when part of the high voltage panel module 3, transformer panel module 2 and low voltage panel module 4 is changed to a different protection degree, only necessary modules may be replaceable without exchanging the entire distributing panel, thereby having an advantage of reducing cost.

Hereinafter, each configuration of the present disclosure will be described in detail.

The base frame 1 may form a low surface appearance of the distributing panel. A load of the transformer panel module 2, high voltage panel module 3 and low voltage panel module 4 may be applied to the base frame 1, and the base frame 1 may support the transformer panel module 2, high voltage panel module 3 and low voltage panel module 4, respectively. The base frame 1 may function as a common base of the transformer panel module 2, high voltage panel module 3 and low voltage panel module 4.

A horizontal length (L1) of the base frame 1 may be larger than that of the transformer panel module 2, high voltage panel module 3 and low voltage panel module 4, respectively, as illustrated in FIG. 1. The horizontal length (L1) of the base frame 1 may be the same as or slightly larger than a sum of a horizontal length (L2) of the transformer panel module 2, a horizontal length (L3) of the high voltage panel module 3, and a horizontal length (L4) of the low voltage panel module 4.

A lower hole 11 for fork lift for inserting a lifter member (not shown) of the fork lift (not shown) may be formed on the base frame 1. When the lifter member of the fork lift is inserted into the lower hole 11 for fork lift and then the base frame 1 is lifted up by the lifter member, the entire distributing panel may be moved. The transformer 21 may be disposed at an upper side of the base frame 1.

The transformer 21 may step down high voltage power applied from the switch 31 to low voltage power. A dry transformer such as an oil transformer or mold transformer may be applicable to the transformer 21.

The transformer panel module 2 may have a shape in which a front surface and a rear surface thereof are closed or a shape in which a left side and a right side thereof are open.

The main frame 22 may include a left frame 23, and a right frame 24 separated from the left frame 23 in a left and right direction. The main frame 22 may further include a lower frame 25 connecting a lower portion of the left frame 23 to a lower portion of the right frame 24. The main frame 22 may further include an upper frame 26 connecting an upper portion of the left frame 23 to an upper portion of the right frame 24.

The left frame 23, right frame 24, lower frame 25 and upper frame 26 may respectively include a front frame and a rear frame separated in a forward and backward direction.

The left frame 23 may include a left front frame and a left rear frame separated in a forward and backward direction. The right frame 24 may include a left front frame and a right rear frame separated in a forward and backward direction. The lower frame 25 may include a lower front frame and a lower rear frame separated in a forward and backward direction. The upper frame 26 may include an upper front frame and a rear front frame separated in a forward and backward direction.

A left side and a right side of the transformer panel module 2 may be respectively open. Transformer doors 27, 28 may be disposed at least one of the front surface and the rear surface of transformer panel module 2.

The distributing panel may preferable include transformer doors 27, 28 on the front surface and the rear surface of the transformer panel module 2, respectively, to facilitate repair or replacement services for the transformer 21 or the like which is a component disposed within the transformer panel module 2.

A ventilation hole 29 may be formed on the transformer doors 27, 28. Air for cooling the transformer 21 may pass through the ventilation hole 29. For the transformer panel module 2, a natural-convection type and a forced-convection type may be selected according to the cooling method of the transformer 21. The protection degree of the transformer panel module 2 may be adjustable according to the use environment and cooling method thereof.

A front opening portion opened in a forward and backward direction may be formed on a front surface of the main frame 22, and the transformer panel module 2 may include a front door 27 rotatably installed on the main frame 22 to open or close the front opening portion. The front door 27 may be installed on a front surface of the main frame 22 to form a front appearance of the transformer panel module 2. The front door 27 may be opened or closed to service an inside of the transformer panel module 2, and formed with the ventilation hole 29 to help ventilation within the transformer panel module 2.

A rear opening portion opened in a forward and backward direction may be formed on a rear surface of the main frame 22, and the transformer panel module 2 may include a rear door 28 rotatably installed on the main frame 22 to open or close the rear opening portion. The rear door 28 may be installed on a rear surface of the main frame 22 to form a rear appearance of the transformer panel module 2. The rear door 28 may be opened or closed to service an inside of the transformer panel module 2, and formed with the ventilation hole 29 to help ventilation within the transformer panel module 2.

An outside cable (not shown) led to an inside of the high voltage enclosure 32 from an outside of the distributing panel may be connected to the switch 31.

The switch 31 may be connected to the transformer 21 and a high voltage cable 37 as illustrated in FIG. 3. The high voltage cable 37 may be used in a surface grounded state.

An end of the high voltage cable 37 may be connected to a high voltage terminal 31a of the switch 31, and the other end thereof may be connected to a high voltage terminal 21a of the transformer 21. Part of the high voltage cable 37 may be located within the high voltage enclosure 32, and the rest thereof may be located within the low voltage enclosure 42.

The high voltage enclosure 32 may form an outer appearance of the high voltage panel module 3. The high voltage enclosure 32 may have a shape in which a front surface, a rear surface, a left side, a right side and an upper surface thereof are closed. The high voltage enclosure 32 may have a shape in which a lower surface thereof is open.

The distributor 41 may include a breaker-type distributor including a breaker 41a such as ACB, MCCB or the like. The distributor 41 may include a fuse-type distributor including a fuse. The distributor 41 may include at least one of a breaker-type distributor and a fuse-type distributor.

The distributor 41 may be connected to the transformer 21 through a low voltage connecting busbar 47 as illustrated in FIG. 3. The low voltage connecting busbar 47 may include a plurality of busbars 47a, 47b, 47c.

The plurality of busbars 47 may include a flexible busbar 47a connected to the high voltage terminal 21a of the transformer 21.

The plurality of busbars 47a, 47b, 47c may further include a distributor connecting busbar 47b connected to the distributor 41.

The plurality of busbars 47a, 47b, 47c may further include a connection busbar 47c connected to the flexible busbar 47a and distributor connecting busbar 47b, respectively.

The flexible busbar 47a may be installed to be located within the transformer panel module 2. The flexible busbar 47a may be installed to be fixed to the high voltage terminal 21a of the transformer 21. A lower portion of the flexible busbar 47a may be fixed to the high voltage terminal 21a of the transformer 21, and an upper portion thereof may be formed with a free end. The connection busbar 47c may be brought into contact with or separated from the flexible busbar 47a in a state of being connected to the distributor connecting busbar 47b.

Part of the distributor connecting busbar 47b may be installed to be protruded to an outside of the low voltage panel module 4.

The connection busbar 47c may be connected to a portion located at an outside of the low voltage panel module 4 on the distributor connecting busbar 47b. The connection busbar 47c may be inserted into the transformer panel module 2 and brought into contact with the flexible busbar 47a during the mounting of the low voltage panel module 4. The connection busbar 47c may be separated from the flexible busbar 47a and withdrawn out of an inside of the transformer panel module 2 during the separation of the low voltage panel module 4.

The distributor 41 may include a low voltage busbar 48 connected to each power consumer. An end of the low voltage busbar may be connected to a breaker or fuse. The low voltage busbar 48 may be located within the low voltage enclosure 42. The low voltage busbar 48 may be disposed to pass through the low voltage enclosure 42, and the other end thereof may be located at an outside of the low voltage enclosure 42.

The distributor 41 may further include an ammeter, a voltmeter and a power meter, and may further include a power factor correction equipment, according to circumstances.

The low voltage enclosure 42 may form an outer appearance of the low voltage panel module 4. The low voltage enclosure 42 may have a shape in which a front surface, a rear surface, a left side, a right side and an upper surface thereof are closed. The high voltage enclosure 32 may have a shape in which a lower surface thereof is open.

The high voltage enclosure 32 and low voltage enclosure 42 may be disposed at an upper side of the base frame 1 by interposing the transformer panel module 2 therebetween. The high voltage enclosure 32 may be a first side enclosure mounted to be located at one side of the transformer panel module 2, and the low voltage enclosure 42 may be a second side enclosure mounted to be located at the other side of the transformer panel module 2.

The high voltage enclosure 32 may include a first side partition wall 35 for closing one surface of the left and the right sides of the transformer panel module 2. Furthermore, the low voltage enclosure 42 may include a second side partition wall 45 for closing the other surface of the left and the right sides of the transformer panel module 2.

A side door may be disposed on a lateral surface of at least one of the high voltage panel module 3 and low voltage panel module 4. The side door may be preferably provided on the high voltage panel module 3 and low voltage panel module 4, respectively.

The side door 36 of the high voltage panel module 3 may be installed to be located at an opposite side of the first side partition wall 35. The side door 46 of the low voltage panel module 4 may be installed to be located at an opposite side of the second side partition wall 45. The side door 36 of the high voltage panel module 3 may be a first side door that forms one surface appearance of the left and the right sides of the distributing panel, and the side door 46 of the low voltage panel module 4 may be a second side door that forms the other surface appearance of the left and the right sides of the distributing panel.

On the other hand, the high voltage panel module 3 may be disposed in such a manner that a high voltage cable penetration portion 38 through which the high voltage cable 37 passes is protruded in a lateral direction. When the high voltage panel module 3 is fastened to the transformer panel module 2, the high voltage cable penetration portion 38 may be located within the transformer panel module 2.

On the other hand, the distributing panel may further include a transformer panel module roof 5 disposed at an upper side of the main frame 22. An upper surface of the transformer panel module 2 may be open. An upper opening portion opened in an upward and downward direction may be formed on an upper surface of the main frame 22. The transformer panel module roof 5 may be installed to cover the upper opening portion at an upper side of the main frame 22. The transformer panel module roof 5 may be coupled to an upper portion of the main frame 22 through a fastening member such as a screw or the like or an engagement member such as a hook or the like.

The transformer panel module roof 5 may include an upper plate 51 installed to be located at an upper side of the main frame 22. The upper plate 51 may be fastened to the main frame 22 through a fastening member such as a screw or the like, and a fastening portion to which a fastening member such as a screw or the like is fastened may be formed on the upper plate 51.

The transformer panel module roof 5 may further include an upper lifting lug 54 formed with a lifting hole 53. The upper lifting lug 54 may be disposed to be protruded in an upward direction on the upper plate 51. The upper lifting lug 54 may be integrally protruded from the upper plate 51, and fabricated separately from the upper plate 51 and then coupled to the upper plate 51 through fastening member such as a screw or the like or an engagement member such as a hook or the like.

An opened lateral surface of the transformer panel module 2 may be shielded by the high voltage panel module 3 and low voltage panel module 4. The transformer panel module 2 may be located between the high voltage panel module 3 and low voltage panel module 4 in a left and right direction. An opened upper surface of the transformer panel module 2 may be shielded by the transformer panel module roof 5. The transformer panel module 2 may be shielded by the transformer panel module roof 5 and base frame 1 in an upward and downward direction. The transformer panel doors 27, 28 of the transformer panel module 2 may be exposed to an outside, and the peripheral portions (i.e., top, bottom, left and right sides) thereof may be surrounded by the transformer panel module roof 5, low voltage panel module 4, base frame 1 and high voltage panel module 3.

The distributing panel may be moved and used in a state that the base frame 1, transformer panel module 2, high voltage panel module 3, low voltage panel module 4 and transformer panel module roof 5 are combined.

For the movement of the distributing panel, when a lifter member or wire of the lifting mechanism (not shown) is inserted into the lifting hole 53 and locked and then an upper lifting lug 52 is lifted up by the lifter member or wire, the entire distributing panel may be moved.

The distributing panel may allowed to separate the transformer panel module roof 5 from the main frame 22 for internal services, and when the lifter member of the lifting mechanism (not shown) is inserted into the lifting hole 53 and then the upper lifting lug 52 is lifted up by the lifter member, only the transformer panel module roof 5 may be lifted up in an upward direction, and the transformer 21 may be moved in and out through an opened upper surface of the main frame 22.

Figure 5:
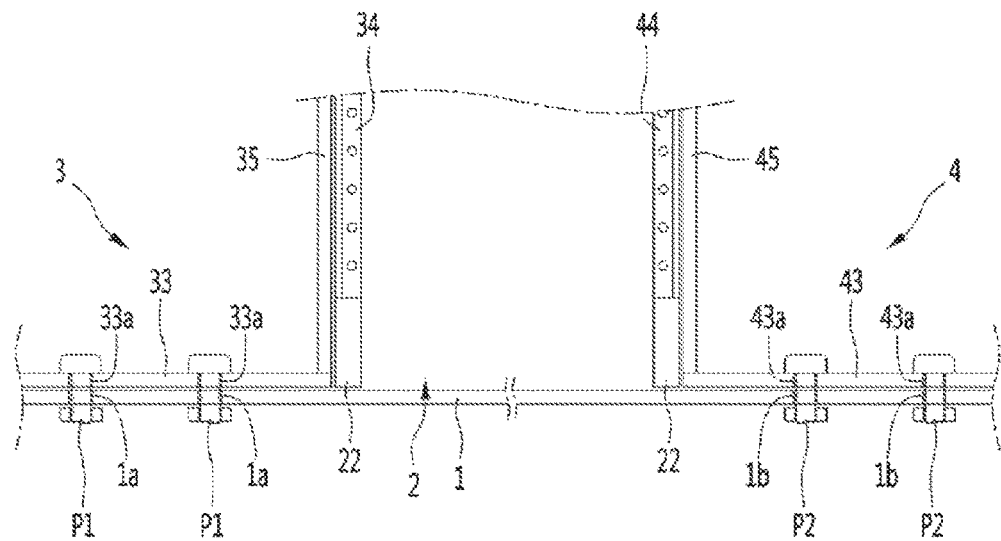
FIG. 5 is an enlarged cross-sectional view in which a high voltage panel module and a low voltage panel module illustrated in FIG. 4 are coupled to a base frame.

FIG. 5 is an enlarged cross-sectional view in which a high voltage panel module and a low voltage panel module illustrated in FIG. 4 are coupled to a base frame.

The high voltage enclosure 32 and low voltage enclosure 42 may respectively include a lower fastening portion fastened to the base frame 1 through a fastening member.

A high voltage enclosure lower fastening portion 33 may be formed at a lower portion of the high voltage enclosure 32 as illustrated in FIG. 5. The high voltage enclosure lower fastening portion 33 may be fastened to the base frame 1 through a fastening member (P1) such as a screw, a bolt, a nut and the like, and fastening holes 33a, 1a to which the fastening member (P1) is fastened may be formed at the high voltage enclosure lower fastening portion 33 and base frame 1, respectively.

A low voltage enclosure lower fastening portion 43 may be formed at a lower portion of the low voltage enclosure 42 as illustrated in FIG. 5. The low voltage enclosure lower fastening portion 43 may be fastened to the base frame 1 through a fastening member (P2) such as a screw, a bolt, a nut and the like, and fastening holes 43a, 1b to which the fastening member is fastened may be formed at the low voltage enclosure lower fastening portion 43 and base frame 1, respectively.

Figure 6:
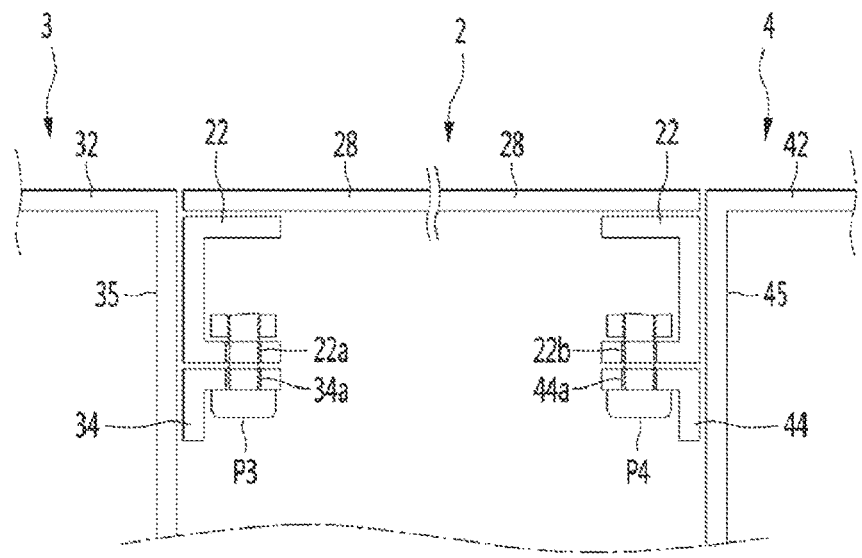
FIG. 6 is an enlarged cross-sectional view in which a high voltage panel module and a low voltage panel module illustrated in FIG. 4 are coupled to a transformer panel module.

FIG. 6 is an enlarged cross-sectional view in which a high voltage panel module and a low voltage panel module illustrated in FIG. 4 are coupled to a transformer panel module.

The high voltage enclosure 32 and low voltage enclosure 42 may respectively include an upper fastening portion fastened to the main frame 22 through a fastening member.

Furthermore, a high voltage enclosure upper fastening portion 34 may be formed at the high voltage enclosure 32 as illustrated in FIG. 6. The high voltage enclosure upper fastening portion 34 may be fastened to the main frame 22 through a fastening member (P3) such as a screw, a bolt, a nut and the like, and fastening holes 34a, 22a to which the fastening member (P3) is fastened may be formed at the high voltage enclosure upper fastening portion 34 and main frame 22, respectively.

Furthermore, a low voltage enclosure upper fastening portion 44 may be formed at the low voltage enclosure 42 as illustrated in FIG. 6. The low voltage enclosure upper fastening portion 44 may be fastened to the main frame 22 through a fastening member (P4) such as a screw, a bolt, a nut and the like, and fastening holes 44a, 22b to which the fastening member (P4) is fastened may be formed at the low voltage enclosure upper fastening portion 44 and main frame 22, respectively.

Figure 7:
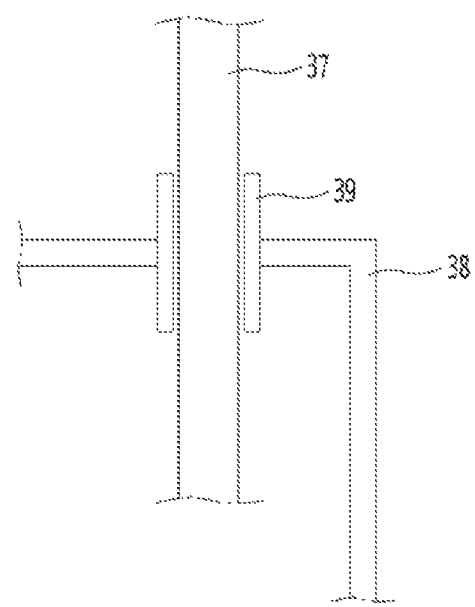
FIG. 7 is an enlarged cross-sectional view illustrating a high voltage cable penetration portion illustrated in FIG. 3.

FIG. 7 is an enlarged cross-sectional view illustrating a high voltage cable penetration portion illustrated in FIG. 3.

A cable gland 39 may be provided in the high voltage cable penetration portion 38, and the high voltage cable 37 may be disposed to pass through the cable gland 39.

The cable gland 39 may be formed in a hollow cylindrical shape, and the high voltage cable 37 may be disposed to pas through the cable gland 39. The cable gland 39 may be disposed to pass through the high voltage cable penetration portion 38. The cable gland 39 may be disposed in such a manner that part thereof is protruded to a space formed at an inner side of the high voltage cable penetration portion 38. The cable gland 39 may be disposed in such a manner that the other part thereof is protruded to an outside of the high voltage cable penetration portion 38.

The cable gland 39 may support a higher IP rating of the high voltage panel module 3 compared to when the cable gland 39 is not installed.

The foregoing description has merely described the technical concept of the present disclosure in an exemplary manner, and it will be apparent to those skilled in this art that various changes and modifications may be made thereto without departing from the gist of the present disclosure.

Accordingly, it should be noted that the embodiments disclosed in the present disclosure are only illustrative and not limitative to the technical concept of the present disclosure, and the scope of the technical concept of the present disclosure is not limited by those embodiments.

The scope protected by the present disclosure should be construed by the accompanying claims, and all the technical concept within the equivalent scope of the invention should be construed to be included in the scope of the right of the present disclosure.

What is claimed is:

1. A module type distributing panel comprising:
   a base frame;
   a transformer panel module having a main frame and a transformer disposed at an upper side of the base frame;
   a first voltage panel module having a first voltage enclosure and a switch mounted within the first voltage enclosure; and
   a second voltage panel module having a second voltage enclosure and a distributor mounted within the second voltage enclosure, wherein a second voltage of the second voltage panel module is lower than a first voltage of the first voltage panel module,
   wherein the first voltage enclosure is coupled to the main frame for the first voltage panel module, and
   the second voltage enclosure is coupled to the main frame for the second voltage panel module,
   wherein a first voltage enclosure lower fastening portion is formed at a first lower portion of the first voltage enclosure connected to the base frame, and a second voltage enclosure lower fastening portion is formed at a second lower portion of the second voltage enclosure connected to the base frame, wherein the transformer panel, the first voltage panel, and the second voltage panel are located on top of the base frame,
   wherein an upper surface of the transformer panel module is open, and the distributing panel further comprises a transformer panel module roof detachably disposed at an upper side of the main frame,
   wherein the transformer panel module roof comprises an upper plate installed to be located at an upper side of the main frame and an upper lifting lug formed of a plate with a lifting hole, wherein the upper lifting lug is coupled to the upper plate,
   wherein a horizontal length of the base frame is greater than a horizontal length of each of the transformer panel module, the first voltage panel module, and the second voltage panel module,
   wherein the transformer panel module roof that is disposed at the upper side of the main frame does not cover the first voltage panel module and the second voltage panel module, and a horizontal length of the transformer panel module roof is smaller than the horizontal length of the base frame, and
   wherein a protection degree of the first voltage panel module and the second voltage panel module is greater than a protection degree of the transformer panel module, and the protection degree of the first voltage panel module and the second voltage panel module is equal to or greater than IP54.

2. The distributing panel of claim 1, wherein the distributing panel includes a lower hole formed on the base frame for inserting a lifter member of a fork lift.

3. The distributing panel of claim 1, wherein a left side and a right side of the transformer panel module are respectively open, and
the first voltage enclosure comprises a first side partition wall for blocking one of the left side and the right side of the transformer panel module, and
the second voltage enclosure comprises a second side partition wall for blocking the other one of the left side and the right side of the transformer panel module.

4. The distributing panel of claim 3, wherein the first voltage panel module is disposed in such a manner that a first voltage cable penetration portion through which a first voltage cable passes is protruded in a lateral direction, and
the first voltage cable penetration portion is located within the transformer panel module.

5. The distributing panel of claim 3, wherein a transformer door is disposed on at least one surface of a front surface and a rear surface of the transformer panel module, and
a side door is disposed on a lateral surface of at least one of the first voltage panel module and second voltage panel module.

6. The distributing panel of claim 5, wherein the transformer door is disposed on the front surface and the rear surface of the transformer panel module, respectively, and
a ventilation hole is disposed on the transformer door.

* * * * *